US008894288B2

(12) United States Patent
Pisani et al.

(10) Patent No.: US 8,894,288 B2
(45) Date of Patent: Nov. 25, 2014

(54) SYSTEM AND METHOD FOR COOLING A HOVER-CAPABLE AIRCRAFT TRANSMISSION

(71) Applicant: AgustaWestland S.p.A., Samarate (IT)

(72) Inventors: Paolo Pisani, Samarate (IT); Andrea Gabrielli, Samarate (IT)

(73) Assignee: AgustaWestland S.p.A., Samarate (IT)

( * ) Notice: Subject to any disclaimer, the term of this patent is extended or adjusted under 35 U.S.C. 154(b) by 0 days.

(21) Appl. No.: 14/037,090

(22) Filed: Sep. 25, 2013

(65) Prior Publication Data

US 2014/0090820 A1    Apr. 3, 2014

(30) Foreign Application Priority Data

Sep. 28, 2012  (EP) ..................................... 12425158

(51) Int. Cl.
```
F16C 37/00      (2006.01)
F16C 33/66      (2006.01)
B64D 13/08      (2006.01)
B64C 27/12      (2006.01)
B64D 33/08      (2006.01)
```
(52) U.S. Cl.
CPC ................ *B64D 13/08* (2013.01); *B64C 27/12* (2013.01); *B64D 33/08* (2013.01)
USPC ............ 384/476; 384/467; 384/471; 384/493

(58) Field of Classification Search
USPC ......... 384/467, 471, 476, 493, 557, 609, 905; 165/108, 129, 212, 214, 244; 310/58–59, 64; 60/266
See application file for complete search history.

(56) References Cited

U.S. PATENT DOCUMENTS

| 2,160,281 | A | * | 5/1939 | Price ........................... 244/53 R |
| 2,894,155 | A | * | 7/1959 | Labastie ......................... 310/54 |
| 2,981,063 | A | * | 4/1961 | Wickman ........................ 60/791 |
| 4,083,518 | A | * | 4/1978 | Garrison et al. ........... 244/17.11 |
| 4,147,024 | A | * | 4/1979 | Moellmann .................. 60/39.15 |

(Continued)

FOREIGN PATENT DOCUMENTS

| EP | 1 739 011 | 1/2007 |
| EP | 2 409 919 | 1/2012 |

(Continued)

*Primary Examiner* — Marcus Charles
(74) *Attorney, Agent, or Firm* — Leason Ellis LLP

(57) ABSTRACT

A system for cooling a transmission of a hover-capable aircraft, the system having: a stator; a heat exchanger connectable thermally to the transmission; a fan for creating a current of a first heat-carrying fluid from the heat exchanger to the fan itself, to remove heat from the heat exchanger; a rotary member, which rotates about an axis to rotate an impeller of the fan about the axis; and a bearing supporting the rotary member for rotation about the axis; the system also having cooling means for cooling the bearing, and in turn having conducting means for conducting a current of a second heat-carrying fluid along a path from an outside environment, external to the bearing, to and to cool the bearing itself.

14 Claims, 3 Drawing Sheets

(56) References Cited

U.S. PATENT DOCUMENTS

| | | | |
|---|---|---|---|
| 4,424,947 A * | 1/1984 | Adams et al. | 244/134 D |
| 4,450,899 A * | 5/1984 | Jakobsson et al. | 165/279 |
| 4,896,499 A * | 1/1990 | Rice | 60/792 |
| 5,169,181 A * | 12/1992 | Timm et al. | 285/276 |
| 6,786,036 B2 * | 9/2004 | Kight | 60/204 |
| 6,990,798 B2 * | 1/2006 | Bouchard et al. | 60/269 |
| 2002/0110450 A1 * | 8/2002 | Swinton | 415/143 |
| 2002/0162318 A1 | 11/2002 | Kight | |
| 2004/0150270 A1 * | 8/2004 | Nagayama et al. | 310/61 |
| 2009/0090107 A1 * | 4/2009 | Youssef et al. | 60/602 |
| 2011/0214931 A1 * | 9/2011 | Nakashima | 180/68.1 |
| 2012/0234513 A1 * | 9/2012 | Watanabe | 165/41 |

FOREIGN PATENT DOCUMENTS

| | | | | |
|---|---|---|---|---|
| FR | 2962488 A1 * | 2/2012 | | F02C 1/04 |
| GB | 1 181 028 | 2/1970 | | |
| JP | 2004101113 A * | 4/2004 | | F28D 11/02 |
| KR | 2006069193 A * | 6/2006 | | F24F 1/00 |

* cited by examiner

SYSTEM AND METHOD FOR COOLING A HOVER-CAPABLE AIRCRAFT TRANSMISSION

CROSS-REFERENCE TO RELATED APPLICATION

The present application claims priority to European Patent Application. No. 12425158.8, filed Sep. 28, 2012, which is hereby incorporated by reference in its entirety.

TECHNICAL FIELD

The present invention relates to a system for cooling a hover-capable aircraft transmission.

The present invention also relates to a method of cooling a hover-capable aircraft, e.g. helicopter, transmission.

BACKGROUND OF THE INVENTION

As is known, helicopters are normally equipped with a number of transmissions for transmitting power from one or more turbines to the main and/or tail rotor, and/or to various accessory devices, e.g. for powering operation of on-board instruments.

Lubricating fluid, typically oil, is circulated in known manner inside the transmission to both lubricate and cool the moving parts.

For effective lubrication and cooling, the lubricating fluid circulating inside the transmissions must be cooled.

So, helicopters are equipped with cooling systems substantially comprising:
- a heat exchanger for exchanging heat between the transmission oil and the air circulating inside the cooling system; and
- a fan for creating airflow from the heat exchanger to the fan itself.

More specifically, the airflow draws heat from the heat exchanger, and hence the transmission, and flows over the fan at a temperature of about 125° C.

The cooling systems also comprise:
- a casing;
- a shaft connected to a drive member to rotate the fan; and
- one or more bearings supporting the shaft with respect to the casing.

The hot airflow from the heat exchanger to the fan heats the area around the bearings, thus reducing their working life and dependability.

A need is therefore felt within the industry for a system of cooling helicopter transmissions without impairing the working life and dependability of the fan shaft bearings.

Known helicopter transmission cooling systems are described in GB 591,982 and KR-A-20100109717.

EP-A-2409919 discloses a system for cooling a transmission of an aircraft, comprising a stator, a fan for creating a current of a heat-carrying fluid towards the heat-exchanger, a shaft rotating about an axis to rotate an impeller of the fan, and a bearing supporting the shaft in rotation about the axis and with respect to the stator.

Due to the fact that the fan creates a current of the heat-carrying fluid directed towards the heat-exchanger, the bearing of EP-A-2409919 does not run a substantial risk of overheating.

SUMMARY OF THE INVENTION

It is an object of the present invention to provide a helicopter transmission cooling system designed to meet the above demand in a straightforward, low-cost manner.

According to the present invention, there is provided a system for cooling a transmission of a hover-capable aircraft, according to claim 1.

The present invention also relates to a method of cooling a transmission of a hover-capable aircraft, according to claim 10.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
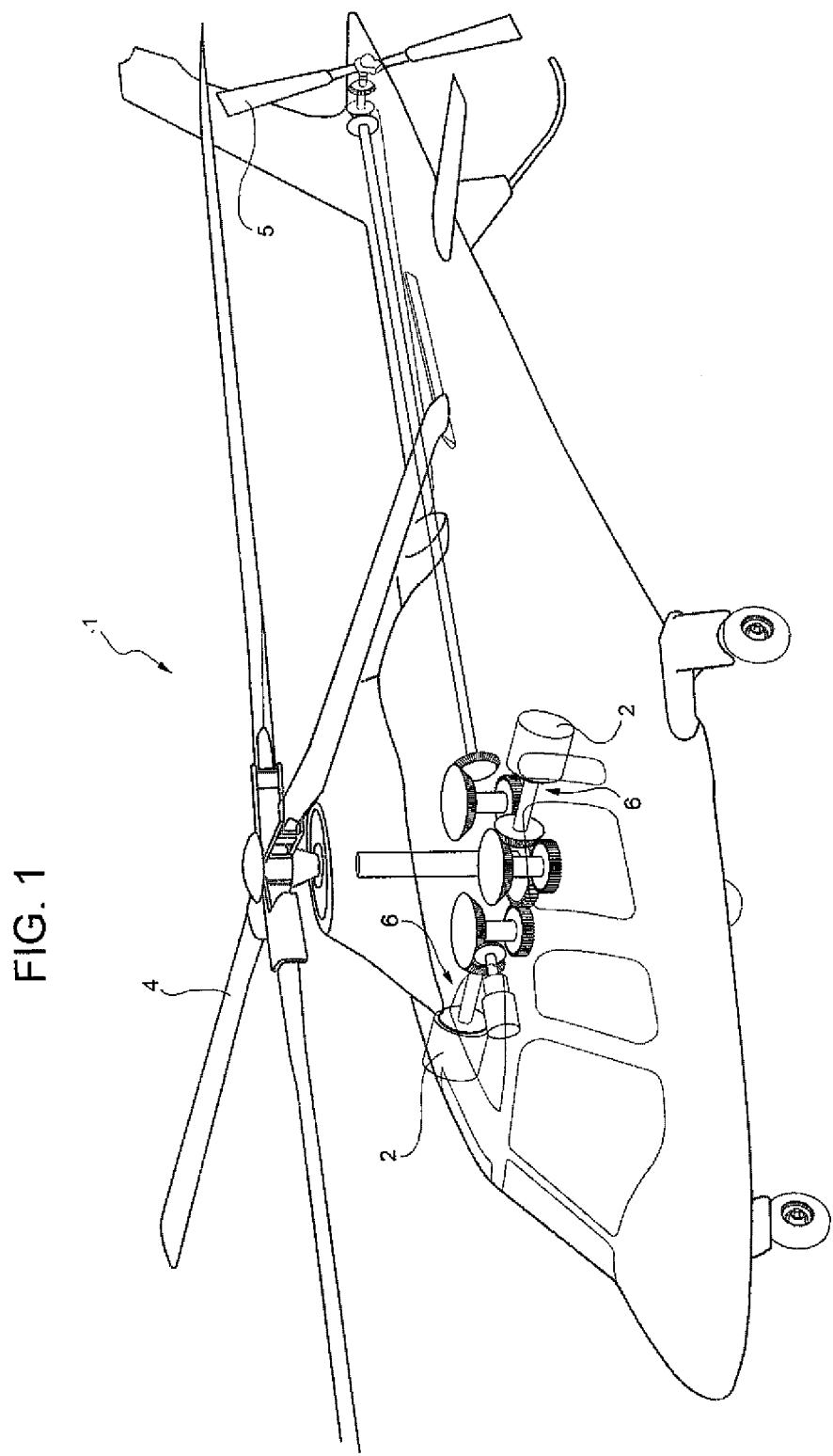
FIG. 1 shows a view in perspective of a helicopter comprising a cooling system in accordance with the present invention.

Number 1 in FIG. 1 indicates a helicopter comprising two turbines 2, a main rotor 4, and a tail rotor 5.

Helicopter 1 also comprises a number of secondary transmissions 6 for transmitting power from one of turbines 2 to respective known accessory devices (not shown), e.g. for powering respective on-board equipment.

One of transmissions 6 is of the type described in Patent Application 05425470.1.

Helicopter 1 also comprises a cooling system 7 for cooling the lubricating fluid circulating inside transmission 6.

Figure 2:
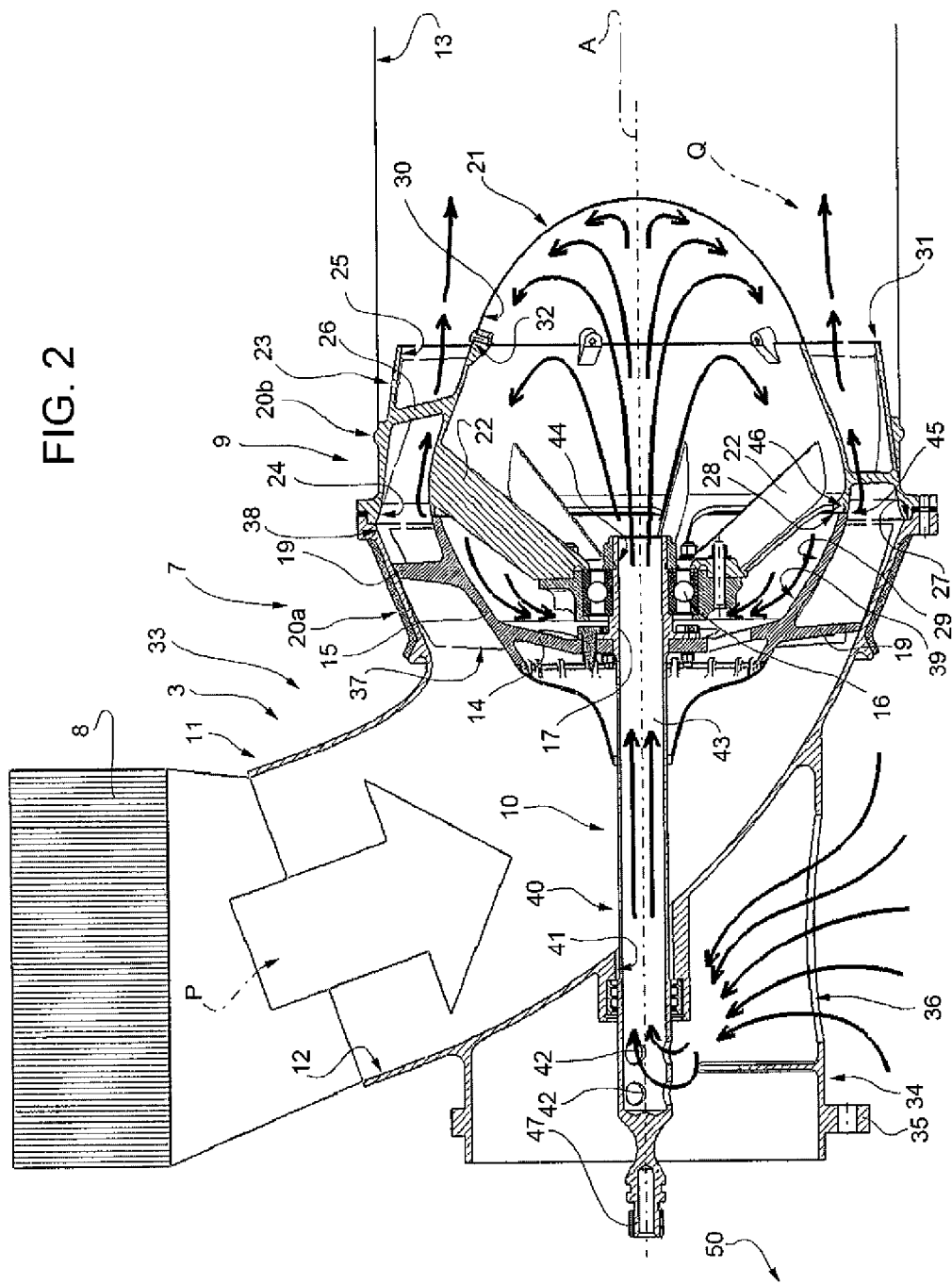
FIG. 2 shows an axial section of the FIG. 1 cooling system.
Figure 3:
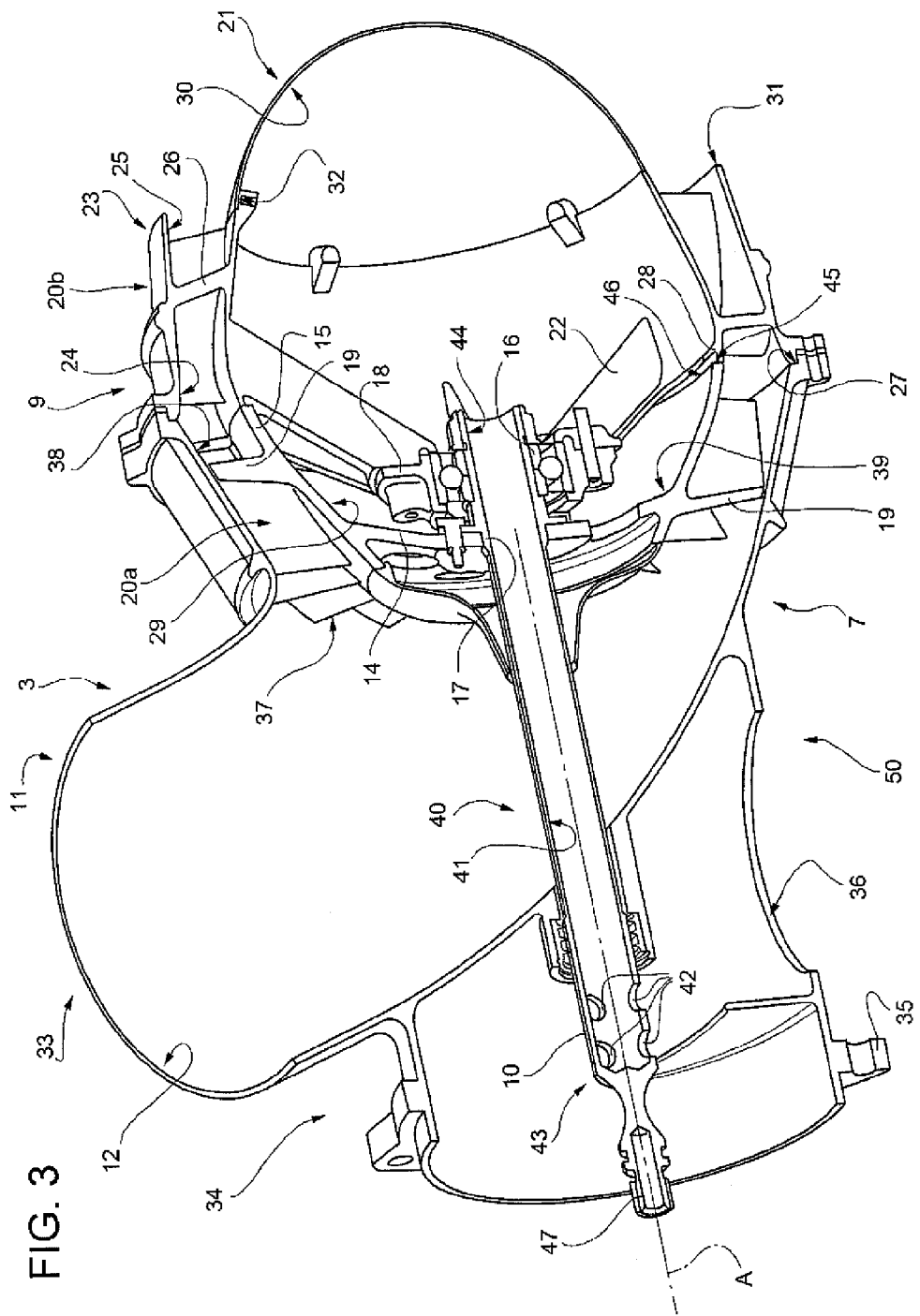
FIG. 3 shows the FIG. 1 cooling system with parts removed for clarity.

System 7 (FIGS. 2 and 3) substantially comprises:
- a stator 3;
- a heat exchanger, e.g. a radiator, 8 connected thermally and adjacent to transmission 6;
- a fan 9; and
- a shaft 10 rotating about an axis A.

Fan 9 is located downstream from heat exchanger 8, and substantially comprises an impeller 20a rotated by shaft 10 about axis A; and a diffuser 20b fixed with respect to axis A and located downstream from impeller 20a.

Fan 9 circulates a current P (indicated by the pale arrow in FIG. 2) of a heat-carrying fluid—in the example shown, the hot air inside stator 3—from heat exchanger 8 to diffuser 20b to draw heat from, and cool the lubricating oil of, transmission 6.

In the flow direction of current P, stator 3 substantially comprises:
- a casing 11 fixed by a flange 35 to the fixed part of transmission 6;
- a tubular body 23 fixed to casing 11 and forming part of diffuser 20b; and
- an outlet pipe 13 (only shown schematically in FIGS. 2 and 3) connected to tubular body 23 and located on the opposite side of fan 9 to heat exchanger 8.

More specifically, casing 11 comprises:
- a curved portion 33, which defines an inlet 12 facing heat exchanger 8, and houses fan 9; and
- an axial portion 34 projecting from portion 33 and connected by flange 35 to the fixed part of transmission 6.

More specifically, portion 33 is interposed between heat exchanger 8 and tubular body 23 of diffuser 20b.

In the example shown, casing 11 is curved and/or made of aluminium.

Shaft 10 is housed partly in portion 33 and partly in portion 34.

Impeller 20a substantially comprises:
a predominantly radial wall 14 fixed to shaft 10;
a wall 15 sloping with respect to axis A and extending from both sides of wall 14; and
a number of blades 19, which are spaced angularly about axis A, project radially from wall 15, on the opposite side to wall 14, and are separated by an annular gap from a wall of portion 33, adjacent to diffuser 20b and opposite heat exchanger 8.

Blades 19 interact with the hot air inside casing 11 to create a low pressure at inlet 12 and, hence, current P.

Inside, impeller 20a defines a cavity 29 housing bearing 16.

Being swept by current P, impeller 20a heats up during operation of system 7, and transmits heat to bearing 16, which thus operates at a temperature of roughly 125° C.

In the direction of current P from heat exchanger 8 to diffuser 20b, impeller 20a also comprises:
an annular inlet section 37 upstream from blades 19 and extending radially between the portion of wall 15 upstream from blades 19, and the inner wall of portion 33 of casing 11; and
an annular outlet section 38 downstream from blades 19 and extending radially between the portion of wall 15 downstream from wall 14, and the inner wall of portion 33 of casing 11.

In the example shown, the reaction of impeller 20a is such that outlet section 38 is at a lower pressure than the outside environment 50.

Fan 9 distributes pressure radially inside cavity 29.

More specifically, when fan 9 is running, the radially innermost area, close to shaft 10, of cavity 29 is at a lower pressure than inlet section 37 of fan 9.

Diffuser 20b substantially comprises:
an ogival body 21 tapering radially from fan 9, in the direction away from heat exchanger 8;
a number of ribs 22 projecting towards axis A from ogival body 21;
tubular body 23 surrounding ogival body 21; and
a number of blades 26 spaced angularly about axis A and extending between tubular body 23 and ogival body 21.

Tubular body 23 and ogival body 21 define an inlet section 24 and an outlet section 25 for current P.

Inlet section 24 and outlet section 25 are annular with respect to axis A.

Inlet section 24 of diffuser 20b is defined radially between an axial end 27 of tubular body 23 facing fan 9, and an end 28 of ogival body 21 facing fan 9.

Outlet section 25 of diffuser 20b is defined radially between an end 31, opposite end 27, of tubular body 23, and a corresponding portion 32 of ogival body 21.

In the example shown, tubular body 23 is truncated-cone-shaped, of axis A, and tapers from end 27 to end 31.

Inside, ogival body 21 defines a cavity 30 tapering radially from end 28 in the direction away from impeller 20a.

Cavity 30 is open on the impeller 20a side and communicates fluidically with cavity 29, and is closed on the opposite side to impeller 20a.

Bearing 16 is housed in a portion of cavity 29 radially inwards of wall 15 of impeller 20a.

Bearing 16 is interposed radially between a bushing 17 fitted to shaft 10 and to fan 9, and a flange 18 fixed to ribs 22 of diffuser 20b.

Bushing 17 is located radially inwards of flange 18 with respect to axis A.

More specifically, bearing 16 is located radially inwards of end 28 of ogival body 21, and is interposed axially between wall 14 of impeller 20a and ribs 22, so the action of fan 9 and diffuser 20b places bearing 16 at a lower pressure than the outside environment 50.

System 7 advantageously comprises cooling means for cooling bearing 16, and which comprise conducting means 40 for conducting a current Q (shown by the bold arrows in FIG. 2) of a second heat-carrying fluid—in particular, ambient-temperature air—along a path from outside environment 50 to bearing 16, so as to cool bearing 16.

It is important to note that conducting means 40 conduct current Q using only the pressure gradient between outside environment 50 and cavity 30, i.e. with no need for any powered devices, such as pumps, in addition to impeller 20a.

More specifically, conducting means 40 comprise a cavity 41 formed in shaft 10 and coaxial with axis A; cavity 30 defined by ogival body 21; and cavity 29 defined by impeller 20a.

Cavity 41 communicates fluidically with the outside environment through a number of holes 42 in the lateral surface 43 of shaft 10, and communicates fluidically with cavity 30 defined by diffuser 20b.

More specifically, shaft 10 comprises:
an open axial end 44 located on the diffuser 20b side to fluidically connect cavity 41 to cavity 30; and
a closed axial end 47 opposite end 44 and outside stator 3.

Holes 42 are formed through a portion of surface 43 opposite end 44 and housed inside portion 34 of casing 11.

More specifically, holes 42 are equally spaced angularly, and connect outside environment 50 fluidically to cavity 41.

More specifically, holes 42 are located, radially with respect to axis A, over a slot 36 formed through portion 34 of casing 11, and which connects outside environment 50 fluidically to the inside of portion 34.

For any position of shaft 10 about axis A, current Q therefore flows from outside environment 50 through slot 36 into portion 34, and from the inside of portion 34 through holes 42 into cavity 41.

Impeller 20a and diffuser 20b define between them an annular passage 45 for current Q.

Passage 45 communicates fluidically with outlet pipe 13 to expel current Q together with current P along outlet pipe 13.

More specifically, passage 45 extends between an annular end 46 of wall 15, and end 28 of ogival body 21.

More specifically, end 46 defines cavity 30 radially outwards.

Passage 45 also fluidically connects cavity 30 and inlet section 24 of diffuser 20b.

The Applicant has observed that, when fan 9 is run, passage 45 is at a lower static pressure than cavities 29 and 30.

When transmission 6 is running, the lubricating oil inside overheats.

By virtue of heat exchanger 8, the air in stator 3 reaches a temperature of about 125° C.

Rotation of shaft 10 about axis A rotates impeller 20a.

Rotation of impeller 20a creates hot-air current P, which flows from heat exchanger 8 to outlet pipe 13, and draws heat from heat exchanger 8 and, therefore, from transmission 6.

More specifically, current P flows through inlet section 37 of impeller 20a, interacts with blades 19, and flows away from impeller 20a along outlet section 38.

Impeller 20a is thus immersed in hot-air current P.

The reaction of fan 9 lowers the pressure inside inlet section 37 with respect to that of outside environment 50.

The Applicant has observed a pressure difference of roughly a few KPa between outside environment 50 and the area of cavity 29 housing bearing 16.

Fan 9 generates ambient-temperature air current Q.

More specifically, the pressure difference draws current Q through slot 36 in portion 34, and through holes 42 in shaft 10 into cavity 41 inside shaft 10.

From there, the pressure difference draws current Q through end 44 into cavity 30 of diffuser 20b.

The difference in pressure produced by impeller 20a first directs current Q (along the path shown in FIG. 2) onto the radially outermost areas of cavity 30 in diffuser 20b, i.e. in a spinning direction with respect to axis A.

Current Q then flows into, and produces a vortex field inside, cavity 29, and so reaches and cools bearing 16.

Passage 45 being the low static pressure point of cavities 29 and 30, current Q then flows through passage 45 to inlet section 24 of diffuser 20b, where it mixes with current P.

Finally, currents P and Q interact with fixed blades 26 of diffuser 20b, and flow through outlet section 25 of diffuser 20b into outlet pipe 13.

The advantages of system 7 and the method according to the present invention will be clear from the above description.

In particular, current Q cools bearing 16, thus improving its dependability by preventing it from operating at high temperature, e.g. of about 120° C.

Current Q being generated by the static pressure difference between outside environment 50 and cavities 29 and 30, bearing 16 is cooled using the static pressure difference produced by fan 9, i.e. with no need for any further drive devices.

Current Q flows into cavity 41 in shaft 10, cavity 30 in diffuser 20b, and cavity 29 in impeller 20a, which means it is produced with no need for any additional component parts, over and above the normally existing parts of known cooling systems.

Clearly, changes may be made to system 7 and the method as described and illustrated herein without, however, departing from the protective scope of the accompanying Claims.

The invention claimed is:

1. A system (7) for cooling a transmission (6) of a hover-capable aircraft (1), the system comprising:
    a stator (3);
    a heat exchanger (8) connectable thermally to said transmission (6);
    a fan (9) for creating a first current (P) of a first heat-carrying fluid from said heat exchanger (8) to the fan (9) itself, to remove heat from said heat exchanger (8);
    a rotary member (10), which rotates about an axis (A) to rotate an impeller (20a) of said fan (9) about said axis (A); and
    a bearing (16) supporting said rotary member (10) for rotation about said axis (A) and with respect to said stator (3);
    the system being characterized by comprising cooling means for cooling said bearing (16); said cooling means comprising conducting means (40; 42, 41, 30, 29) for conducting a second current (Q) of a second heat-carrying fluid along a path from an outside environment (50), external to said bearing (16), to said bearing (16), so as to cool the bearing (16);
    said conducting means (40; 42, 41, 30, 29) comprising:
        a first cavity (41) defined by said rotary member (10) and connectable fluidically to said outside environment (50); and
        a second cavity (29) into which said bearing (16) faces, and which, when said impeller (20a) is operated, is at a lower pressure than said outside environment (50) external to said bearing (16);
    said second cavity (29) being defined by said impeller (20a).

2. A system as claimed in claim 1, characterized in that said rotary member (10) comprises an open first axial end (44) connecting said first and second cavity (41, 29).

3. A system as claimed in claim 2, characterized in that said rotary member (10) comprises:
    a lateral surface (43) defining said holes (42); and
    a closed second axial end (47) opposite said first axial end (44).

4. A system as claimed in claim 1, characterized in that said conducting means (40; 42, 41, 30, 29) also comprise a number of inlet openings for said second current (Q) of said second heat-carrying fluid; said inlet openings being defined by respective through holes (42) in said rotary member (10); and said holes (42) being open on the side facing said outside environment (50), and on the opposite side facing said first cavity (41).

5. A system as claimed in claim 1, characterized in that said fan (9) comprises a diffuser (20b) fixed angularly with respect to said axis (A);
    said conducting means (40; 42, 41, 30, 29) comprising a third cavity (30), which is defined by said diffuser (20b), is traversed by said second heat-carrying fluid, and is connected fluidically to said first cavity (41) and said second cavity (29).

6. A system as claimed in claim 5, characterized in that said third cavity (30) is connected fluidically to said first cavity (41) at said first axial end (44) of said rotary member (10); and in that said third cavity (30) is connected fluidically to said second cavity (29) at a section of the third cavity radially outwards of said first axial end (44) of said rotary member (10) with respect to said axis (A).

7. A system as claimed in claim 5, characterized in that said diffuser (20b) comprises an inlet section (24) and an opposite outlet section (25) in the flow direction of said first current (P) of said first heat-carrying fluid;
    said diffuser (20b) and said fan (9) together defining an annular passage (45) for said second current (Q) of said second heat-carrying fluid;
    and said annular passage (45) being connected fluidically to said inlet section (24) of said diffuser (20b) and to said second cavity (29), to permit flow of said second current (Q) of said second heat-carrying fluid to said outlet section (25) of said diffuser (20b).

8. A system as claimed in claim 5, characterized in that said bearing (16) is located radially outwards of said rotary member (10); and in that said third cavity (30) tapers radially from said second cavity (29), on the opposite side to said heat exchanger (8); the maximum radial size of said third cavity (30) being greater than the radial distance between said bearing (16) and said axis (A), so as to first conduct said second current (Q) of said second heat-carrying fluid along a spinning path inside said third cavity (30), and then into said second cavity (29) adjacent to said bearing (16).

9. A method of cooling a transmission (6) of a hover-capable aircraft (1), the method comprising the steps of:
    operating the impeller (20a) of a fan (9) of a cooling system (7) by means of a rotary member (10), which rotates about an axis (A) and is supported by a bearing (16) with respect to a stator (3) of said system (7); and
    creating a first current (P) of a first heat-carrying fluid from a heat exchanger (8), connectable thermally to said transmission (6), to said fan (9), so as to draw heat from said heat exchanger (8);
    said method being characterized by comprising the step of cooling said bearing (16);
    said cooling step comprising the step of conducting a second current (Q) of a second heat-carrying fluid along a path from an outside environment (50), external to said bearing (16), to the bearing (16).

10. A method as claimed in claim 9, characterized in that said step of operating said impeller (20*a*) comprises the step of bringing the environment of said bearing (16) to a lower pressure than that of said outside environment (50) external to said cooling system (7).

11. A method as claimed in claim 10, characterized in that said conducting step comprises the step of conducting said second current (Q) from said first cavity (41) into a second cavity (30) defined by a diffuser (20*b*) of said fan (9), which is angularly fixed with respect to said axis (A);

said step of conducting said second current (Q) from said first cavity (41) into said second cavity (30) comprising the step of conducting said second current (Q) along a spinning path with respect to said axis (A).

12. A method as claimed in claim 11, characterized in that said step of conducting said second current (Q) comprises the further step of conducting said second current (Q), by virtue of a pressure gradient, to an inlet section (24) of said diffuser (20*b*) traversed by said first current (P).

13. A method as claimed in claim 9, characterized in that said conducting step comprises the step of conducting said second current (Q) into a first cavity (41) defined by said rotary member (10).

14. A method as claimed in claim 13, characterized in that said conducting step also comprises the step of conducting said second current (Q) from said second cavity (30) into a third cavity (29) defined by said impeller (20*a*) and housing said bearing (16);

said step of conducting said second current (Q) from said second cavity (30) into a third cavity (29) comprising the step of creating a vortex inside said third cavity (29).

* * * * *